United States Patent [19]

Takami

[11] Patent Number: 5,799,277
[45] Date of Patent: Aug. 25, 1998

[54] ACOUSTIC MODEL GENERATING METHOD FOR SPEECH RECOGNITION

[75] Inventor: Junichi Takami, Yokosuka, Japan

[73] Assignee: Victor Company of Japan, Ltd., Yokohama, Japan

[21] Appl. No.: 547,794

[22] Filed: Oct. 25, 1995

[30] Foreign Application Priority Data

Oct. 25, 1994 [JP] Japan .................. 6-284135

[51] Int. Cl.$^6$ ...................... G10L 5/04
[52] U.S. Cl. .............. 704/256; 704/254; 704/255; 704/240
[58] Field of Search ............... 395/2.65, 2.41, 395/2.54, 2.45, 2.49, 2.51, 2.52, 2.09, 2.64, 2.53; 704/256, 254, 255, 232, 245, 236, 240, 242, 243, 244, 200

[56] References Cited

U.S. PATENT DOCUMENTS

| | | | |
|---|---|---|---|
| 4,759,068 | 7/1988 | Bahl et al. | 395/2.61 |
| 4,783,804 | 11/1988 | Juang et al. | 395/2.65 |
| 4,820,059 | 4/1989 | Miller et al. | 395/2.09 |
| 4,833,712 | 5/1989 | Bahl et al. | 395/2.52 |
| 5,033,087 | 7/1991 | Bahl et al. | 395/2.65 |
| 5,267,345 | 11/1993 | Brown et al. | 395/2.64 |
| 5,497,447 | 3/1996 | Bahl et al. | 395/2.54 |
| 5,506,933 | 4/1996 | Nitta | 395/2.65 |
| 5,522,011 | 5/1996 | Epstein et al. | 395/2.31 |
| 5,608,841 | 3/1997 | Tsuboka | 395/2.65 |
| 5,621,859 | 4/1997 | Schwartz et al. | 395/2.65 |

FOREIGN PATENT DOCUMENTS 06202687A 7/1994 Japan .................. G10L 3/00

*Primary Examiner*—Richemond Dorvil
*Attorney, Agent, or Firm*—Jacobson, Price, Holman & Stern, PLLC

[57] ABSTRACT

The acoustic model generating method for speech recognition enables a high representation effect on the basis of the minimum possible model parameters. In an initial model having a smaller number of signal sources, the acoustic model for speech recognition is generated by selecting the splitting processing or the merging processing for the signal sources successively and repeatedly. The merging processing is executed prior to the splitting processing. In the merging processing, when the merged result is not appropriate, the splitting processing is executed for the model obtained before merging processing (without use of the merged result). Further, the splitting processing includes three methods at the same time, as (1) a method of splitting the signal source into two and reconstructing a shared structure between a plurality of states having common signal sources to be split, (2) a method of splitting one state into two states corresponding to different phoneme context categories in phoneme context direction, (3) a method of splitting one state into two states corresponding to different speech sections in time direction. One of the three methods is selected by obtaining three pieces of maximum likelihood for the three splitting steps and judging which one is the biggest to select the splitting step for which the biggest likelihood is obtained.

8 Claims, 3 Drawing Sheets

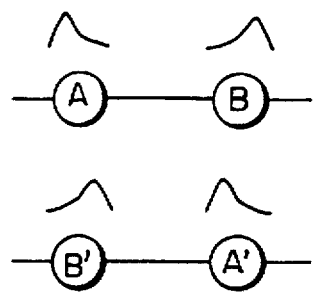
FIG. IA PRIOR ART
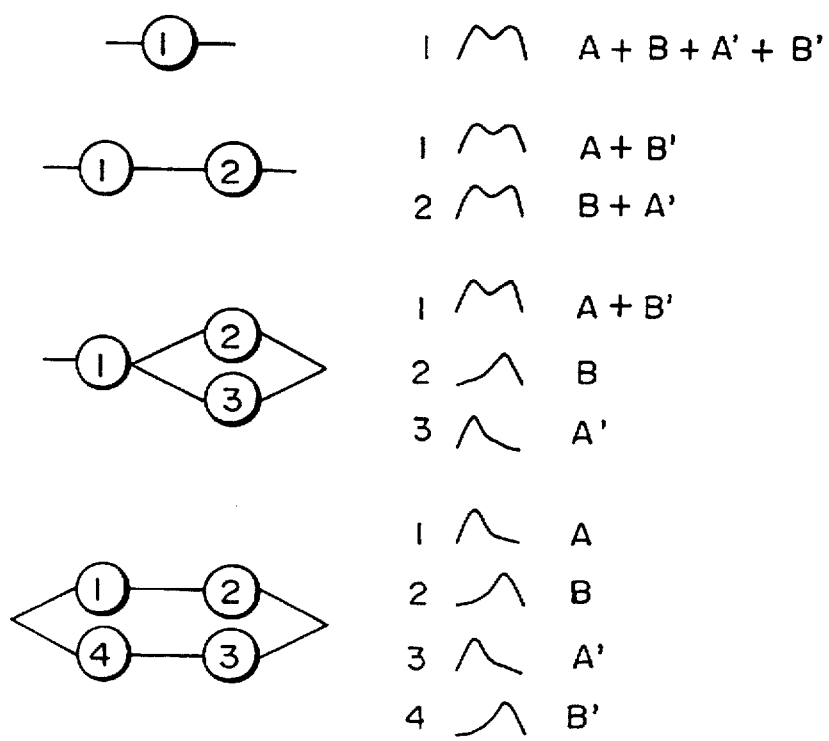
FIG. IB PRIOR ART

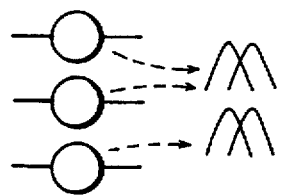 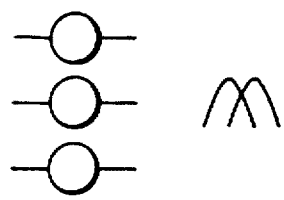 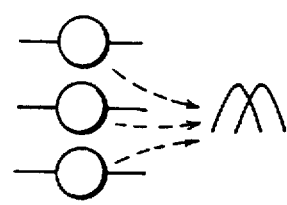
FIG. 2A        FIG. 2B        FIG. 2C
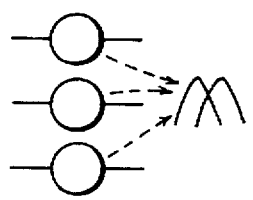 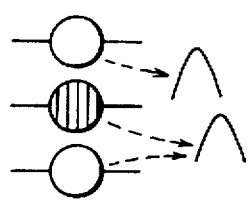 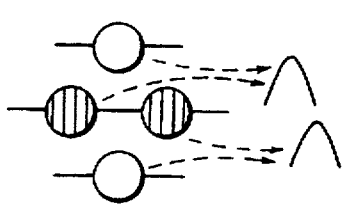
FIG. 3A        FIG. 3B        FIG. 3C

ACOUSTIC MODEL GENERATING METHOD FOR SPEECH RECOGNITION

BACKGROUND OF THE INVENTION

1. Field of the Invention

The present invention relates to an acoustic model generating method for speech recognition. More specifically this invention relates to a method of generating acoustic models for speech recognition using hidden Markov models (referred to as HMM, hereinafter). With this method, the model unit, states of signal sources, the sharing structure between a plurality of states of signal sources, and the signal source parameters for speech recognition can be decided under optimum conditions, in order to model the maximum speech phenomena by use of the minimum possible model parameters. Here, the term "state" means a concept on the model construction corresponding to an inherent phoneme context category.

2. Description of the Prior Art

In the current speech recognition technique, HMM is one of the widely used methods from the standpoints of excellent recognition performance and easy processing.

In order to execute a high precise and robust speech recognition by use of HMM, an important problem is how to allow both the details and the robust stability of the models to be compatible with each other. For the realization of detailed models, it is necessary to decide an appropriate phoneme context category which can cover the overall speech space. Further, for estimation of the models of high robust stability on the basis of limited learning speech samples, it is necessary to introduce a mechanism which can represent only the essential data effectively on the basis of only the minimum possible model parameters, by reducing the redundancy of the model parameters. Recently, such an HMM has been proposed that so-called allophone is determined as a basic recognition unit under consideration of phoneme environment (e.g., the preceding phoneme and the succeeding phoneme) which causes fluctuations in the acoustic patterns of phoneme. However, when the allophone is used as the unit of recognition, since the number of models increases markedly, as compared with the acoustic models using the phoneme as the unit, in the case where the number of learning samples is limited, a serious problem arises with respect to the model learning.

To overcome these problems, a successive state splitting (referred to as SSS, hereinafter) method for generating optimum models on the basis of only state splitting has been proposed by Japanese Published Unexamined (Kokai) Patent Application No. 6-202687. In this SSS algorithm, acoustic models are split into detailed models by starting a small-scaled initial model and by reiterating state splitting along such a guide line that a Cartesian product space of phoneme environment factors is split successively into two.

The advantage of this split-type method as SSS is that the phoneme environment category can be defined as a Cartesian product of each environment factor and that a hierarchical structure can be obtained during the splitting process.

In the conventional speech recognition using HMM, however, the model unit, the model structure and the model parameters have been estimated independently and decided separately under different evaluation criteria. In addition, in many cases, the model unit and the model structure are decided on the basis of the foresighted knowledge or experience. In this case, therefore, there exists a problem in that the optimization cannot be secured and further the reproducibility thereof deteriorates.

When the above-mentioned SSS is adopted, although this problems can be solved, since the conventional SSS is based upon only the processing of successive splitting of the state into two, there exists a problem in that the attained state network structure is limited and therefore it is impossible to perfectly eliminate the redundancy from the model parameters.

In more detail, an example is taken into account such that two signal series as shown in FIG. 1A are to be modeled, in which two features A and B and other two features B' and A' (A' and B' are similar to the features A and B, respectively) are arranged in sequence. In this case, four distributions as shown in FIG. 1B can be obtained. That is, although there exists a possibility that the A and A' and B and B' can be shared (used in common), in the case of SSS, since the model is generated on the basis of only the state splitting, it is impossible to share the signal sources having similar features, with the result that it has been impossible to perfectly eliminate the redundancy from the model parameters.

SUMMARY OF THE INVENTION

With these problems in mind, therefore, it is the object of the present invention to provide an acoustic model generating method for speech recognition of a high representation efficiency, which can realize a soft state network structure and can represent the maximum possible acoustic phenomena at a high precision and in a robust stability.

The present invention provides an acoustic model generating method for a speech recognition dependent upon phoneme context, for executing speech data processing using hidden Markov models obtained by modeling static speech features indicative of speech feature pattern shape in minute time and dynamic speech features indicative of speech change with the lapse of time, as a chain of signal sources composed of one output probability distribution and one set of state transition probability, which comprises the steps of: reiterating splitting processing or merging processing for at least one signal source of an initial model by selecting one of the processing successively to form a plurality of signal sources, until a specific number of the generated signal sources reaches a predetermined value for achieving optimum speech recognition; and deciding, when the number reaches the predetermined value, a phoneme context category of model unit, a specific number of states each used for representing a model, sharing of each state among a plurality of models, sharing each signal source among the states, and a shape of each output probability distribution, all under a common evaluation criterion.

The merging processing may include a step of merging two different signal sources having similar characteristics into a single signal source, to reduce the number of signal sources without deteriorating precision of the acoustic models. The merging step further may include the steps of: calculating a magnitude of distribution on an acoustic parameter space obtained by synthesizing each pair of the signal sources; and merging two signal sources of a pair having minimum calculated distribution.

Further, the merging processing may be executed prior to the splitting processing, and the merging processing comprises the steps of: adopting a merging processing result only when an evaluation value of learning samples obtained as a result of the merging processing is higher than another evaluation value calculated on the basis of already-obtained models having signal sources whose number is the same as that of the model obtained as the result of the merging processing; and disusing the merging processing result except above, and re-executing the splitting processing again by use of the models already obtained before the merging processing.

The adopting step may include the step of obtaining two pieces of sum total likelihood as the evaluation values. Further, the splitting processing may include the step of splitting a first signal source into a second and a third signal source, allocating two mixture distributions of the first signal source to the second and third signal sources, respectively, as output probability distribution, and copying self transition probability value of the first signal source and transition probability value to the succeeding signal source to the second and third signal sources.

Further, the splitting processing includes either of: a first splitting step of splitting two signal sources into two, and reconstructing a shared structure between a plurality of states having common signal sources to be split; a second splitting step of splitting one state into two states corresponding two different phoneme context categories in phoneme context direction, in order to absorb fluctuations of the static speech features due to difference in phoneme context; and a third splitting step of splitting one state into two states corresponding two different speech sections in time direction, in order to absorb fluctuations of the dynamic speech features existing in some phoneme context category, further the acoustic model generating method comprises a step of selecting one of the three splitting steps so that an evaluation value for actual speech samples can be obtained.

The selecting step may include the steps: obtaining three pieces of maximum likelihood for the three splitting steps; and judging which one of the three pieces of maximum likelihood is the biggest to select the splitting step for which the biggest likelihood is obtained.

BRIEF DESCRIPTION OF THE DRAWINGS

FIGS. 1A and 1B are illustrations for assistance in explaining the splitting processing of the conventional successive state splitting (SSS) method;

FIGS. 2A to 2C are illustrations for assistance in explaining the merging procedure of the acoustic model generating method for speech recognition according to the present invention;

FIGS. 3A to 3C are illustrations for assistance in explaining the splitting procedure of the acoustic model generating method for speech recognition according to the present invention.

DETAILED DESCRIPTION OF THE PREFERRED EMBODIMENTS

Figure 4:
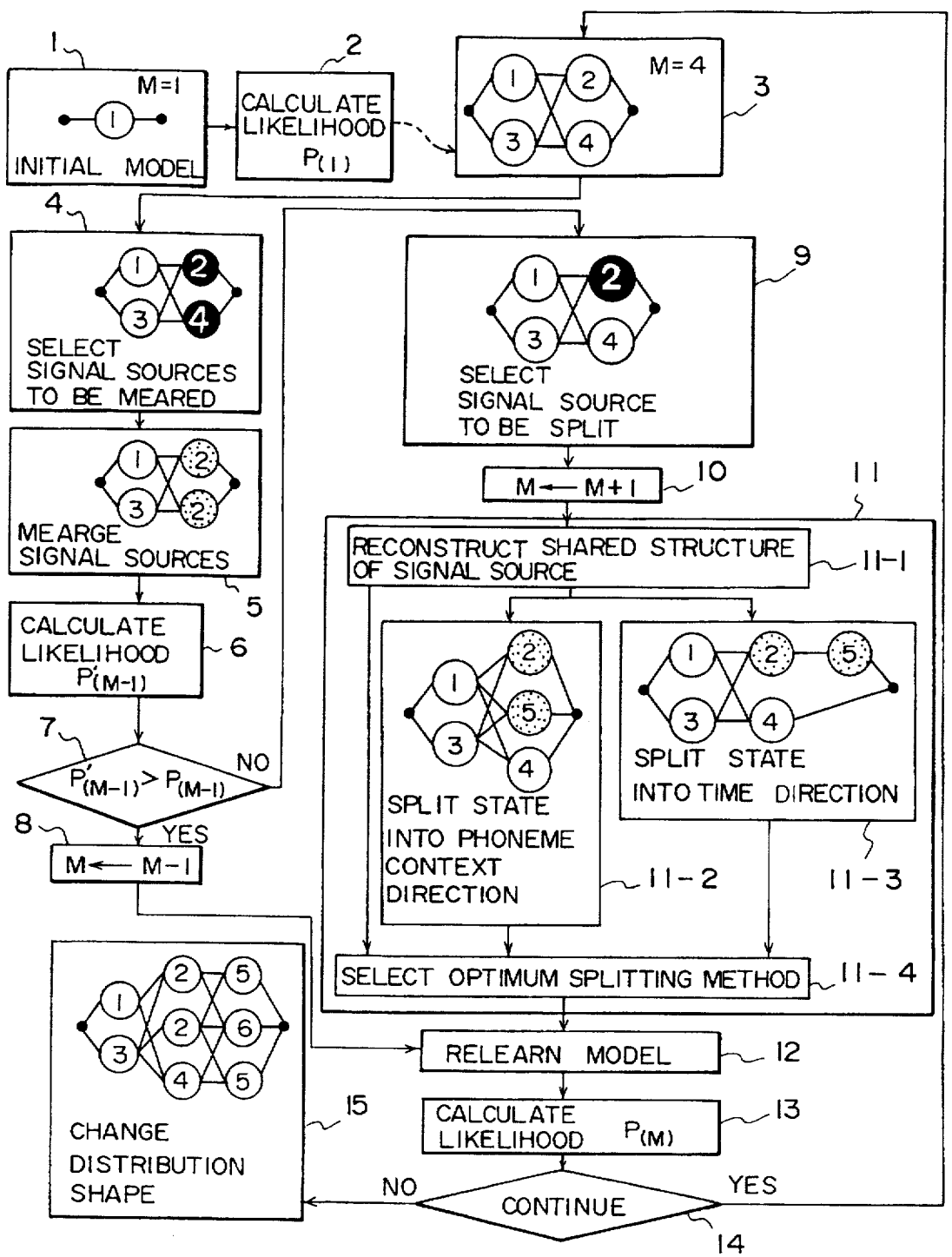
FIG. 4 is a processing flowchart showing the acoustic model generating method for speech recognition according to the present invention.

In the acoustic model generating method for speech recognition, probability models are represented by the shape (the static feature of a speech) of a speech feature pattern in a minute unit time and the change (the dynamic feature of the speech) with the lapse of time, as a chain of a plurality of signal sources. Further, the output probability distributions of the probability models are split or merged repeatedly on the basis of the common evaluation criterion (the maximization of the likelihood), in order to automatically and simultaneously decide the model unit, the state network structure, the sharing structure between a plurality of states of the signal sources, and the output probability distribution parameters.

First, in the acoustic model generating method (referred to as the present method, hereinafter) for the speech recognition according to the present invention, only the processing different from the conventional SSS will be explained.

First, in the present method, whenever the reiterative calculations are executed, an appropriate processing is successively selected by discriminating which one of the splitting processing and the merging processing is effective to improve the likelihood of the overall learning samples.

In more detail, two appropriate signal sources are merged, and the sum total likelihood of all the learning samples is calculated. Only when the obtained sum total likelihood is larger than the already calculated likelihood for the models having the same number of the signal sources of the model obtained after the merging processing, the result of the merging processing is adopted. On the other hand, when the result of the merging processing is not adopted, the splitting processing is executed again returning back to the models obtained before the merging processing.

When the signal sources are merged by the merging processing, the number of states (the number of model parameters) decreases and thereby the model adaptability sometimes drops, so that the result of the merging processing is not adopted sometimes. On the other hand, when the signal sources are split by the splitting processing, even if the number of states (the number of model parameters) increases, since the model adaptability increases, the result of the splitting processing is adopted unconditionally.

Further, since the above-mentioned splitting processing and the merging processing are selected successively, in the present method, whenever the processing is repeated, the relation between the sum total number of the signal sources and the sum total likelihood of the whole learning samples at each processing time is stored in sequence in a memory, during the progress of the processing.

Secondary, the merging processing of the signal sources are executed. The merging processing of the signal sources are not included in the conventional SSS. In the present invention, since the signal sources are merged, the redundancy of the model parameters can be eliminated. In practice, the following processing as shown in FIGS. 2A to 2C is executed.

Two signal sources to be merged are selected as shown in FIG. 2A. The selected two signal sources are merged as a new single signal source, as shown in FIG. 2B. Further, pointers attached to the signal sources to be merged and included in all states are replaced with a radical pointer attached to a newly merged signal source, as shown in FIG. 2C.

Further, thirdly, the splitting processing different from that of the conventional SSS is executed for the signal sources. Basically, the splitting of the signal sources is the same as that of the SSS. However, in the case of the SSS, since the HMnet (Hidden Markov Network) having one-to-one correspondence between the state and the signal source is processed, the splitting of the states having a plurality of shared signal sources is not taken into account. Therefore, in the present method, the above-mentioned splitting processing is executed as follows:

With reference to FIGS. 3A to 3C, signal sources to be split are selected as shown in FIG. 3A. Further, the signal sources (two mixture distributions) to be split are divided into two unit distributions (signal distributions), and any one of the two unit distributions (signal distributions) is allocated to each state sharing the signal sources, as shown in FIG. 3B. Further, one of the states sharing the signal sources is split in the phoneme environment direction or the time direction, where necessary, as shown in FIG. 3C.

Further, the allocation of the unit distribution to the respective states as shown in FIG. 3B, the selection of the signal sources to be split and the decision of the splitting directions thereof as shown in FIG. 3C, and the continuation of the processing to that shown in FIG. 3B or that shown in FIG.3C are all decided on the basis of the criterion at which the likelihood can be maximized.

Further, when a state is occupied by only one signal source, only the processing as shown in FIG. 3C (the splitting processing in the phoneme environment direction or the time direction) is executed, as with the case of the conventional SSS.

An embodiment of the present invention will be described hereinbelow with reference to the attached drawing.

FIG. 4 shows a flowchart of the acoustic model generating method according to the present invention.

First, in step 1, a model including at least one signal source is prepared as an initial model. For instance, the initial model has one state (a concept on the model construction corresponding to an inherent phoneme context category) and one signal source (the minimum composing element of the model composed of output probability distribution and state transition probability). The above-mentioned initial model learned by use of all the learning phoneme samples. Further, the number of signal sources of the initial model, in this case "1", is substituted for the variable M which represents the sum total number of the signal sources used in the entire model, further a sum total likelihood calculated in learning by a well known method, such as forward-pass calculation in Baum-Welch algorithm, is substituted for $P_{(M)}$, in this case $P_{(1)}$, representative of the sum total likelihood when the number of signal source is M (=1) in step 2.

After that, the splitting and merging are repeated for this signal source.

The model generated during the execution of this method in step 3 is referred to as hidden Markov Network (referred to as HMnet, hereinafter), which can represent the model as a plurality of state networks. Further, the HMnet shown in step 3 is an example formed during execution, in which the number of the signal sources used in the sum total models is M=4 without sharing any signal sources in the states, for simplifying the explanation. Here, HMnet can be composed of the following data:

(1) Composing elements of HMnet
* a set of signal sources
* a set of states (2) Composing elements of signal sources
* number (index) of signal sources
* output probability distribution (two-mixture Gaussian distribution represented by diagonal covariance matrix)
* transition probability to self loop probability and succeeding state (3) Composing elements of state
* Number (index) of state
* Pointer of signal source (Number of signal source)
* Receivable phoneme environment category (defined as a Cartesian product of phoneme environment factors)
* List of preceding and succeeding states Further, the signal sources to be merged are selected in the model shown in step 3 (in step 4).

In the selection of the signal sources to be merged, in order to discriminate the similarity between the signal sources, the magnitude of the output probability distribution of the signal sources obtained by the merging processing is used as the evaluation scale. The magnitude $D_{ij}$ of the distribution obtained when the output probability distributions of all the combinations of two signal sources $Q_{(i)}$ and "$Q_{(j)}$ (the two-mixture distributions) can be approximated by the following equations (1) to (5):

$$D_{ij} = \sum_{k}^{K} \frac{D'_{ijk}}{\sigma_{Tk}^2} (n_i + n_j) \quad (1)$$

$$D'_{ijk} = \lambda'_i \sigma'^2_{ik} + \lambda'_j \sigma'^2_{jk} + \lambda'_{ij}(\mu'_{ik}-\mu'_{jk})^2 \quad (2)$$

$$\lambda'_i = n_i/(n_i+n_j) \quad (3)$$

$$\mu'_{ik} = \lambda_{i1}\mu_{i1k} + \lambda_{i2}\mu_{i2k} \quad (4)$$

$$\sigma'^2_{ik} = \lambda_{i1}\sigma^2_{i1k} + \lambda_{i2}\sigma^2_{i2k} + \lambda_{i1}\lambda_{i2}(\mu_{i1k}-\mu_{i2k})^2 \quad (5)$$

where
K : the number of dimensions of acoustic parameters
$n_i$ : the number of samples used to estimate $Q_{(i)}$
$\lambda_{im}$ : branch probability of m-th mixture component of $Q_{(i)}$
$\mu_{imk}$ : an average value of m-th mixture component of $Q_{(i)}$
$\sigma_{imk}^2$ : variance of m-th mixture component of $Q_{(i)}$
$\sigma_{Tk}^2$ : variance of whole learning samples Two signal sources $Q_{(i')}$ and "$Q_{(j')}$ for minimizing $D_{ij}$ are selected as the signal sources to be merged.

After two signal sources to be merged have been selected in step 4, these two signal sources are merged (in step 5).

In the merging of the two signal sources, two signal sources $Q_{(i')}$ and $Q_{(j')}$ are merged so as to form a new signal source $Q_{(l)}$. As the branch probability $\lambda_{lm}'$ the average value $\mu_{lmk}'$ and the variance $\sigma_{lmk}'$ of the m-th mixture components (m=1, 2) of the output probability distribution of $Q_{(l)}$, the values of $\lambda'_{i'}, \mu'_{i'k}$ and $\sigma'^2_{i'k}$, and $\lambda'_{j'}, \mu'_{j'k}$ and $\sigma'^2_{j'k}$ obtained by the equations (3) to (5), respectively are used. Further, self transition probability $a_l^{self}$ of $Q_{(l)}$ and transition probability $a_l^{next}$ of $Q_{(l)}$ to succeeding state are obtained by the equations (6) and (7).

$$a_l^{self} = \lambda'_{i'}a_{i'}^{self} + \lambda'_{j'}a_{j'}^{self} \quad (6)$$

$$a_l^{next} = \lambda'_{i'}a_{i'}^{next} + \lambda'_{j'}a_{j'}^{next} \quad (7)$$

where
$a_l^{self}$ : self state transition probability of $Q_{(l)}$
$a_l^{next}$ : state transition probability of $Q_{(l)}$ to a succeeding state The $Q_{(l)}$ obtained by this processing is shared in all the states to which $Q_{(i')}$ or $Q_{(j')}$ are allocated before merged. For this processing, all the states whose pointer values are i' or j' are replaced with the value 1. By this processing, the number of the signal sources of the sum total models is reduced to (M-1), temporarily.

At this point, it is discriminated as to whether the model obtained as a result of merging processing of the signal sources is adopted or not (in step 7).

The merging processing result is adopted only when the sum total likelihood (denoted by $P'_{(M-1)}$) obtained on the basis of the model after the merging processing exceeds the likelihood $P_{(M-1)}$ obtained when the sum total number of the distributions is (M-1) (already calculated before the merging processing (in step 6)). When the result $P'_{(M-1)}$ of merging processing result is adopted, M is changed to M-1 (in step 8), and model relearning processing is executed (in step 12).

When the merging processing result is not adopted, the model obtained by the merging processing in step 5 is disused, and the splitting processing is executed for the model (shown in step 3) obtained prior to the merging processing of step 5. Prior to the actual splitting, the signal source to be split is selected (in step 9).

The magnitudes $d_i$ of all the signal sources $Q_{(i)}$ are calculated by the following equations, and the signal source (denoted by $Q_{(i')}$) having the largest value $d_i$ is selected as the signal source to be split.

$$d_i = \sum_{k}^{K} \frac{d_{ik}^2}{\sigma_{T_k}} n_l \tag{8}$$

$$d_{ik}^2 = \lambda_{i1}\sigma_{i1k}^2 + \lambda_{i2}\sigma_{i2k}^2 + \lambda_{i1}\lambda_{i2}(\mu_{i1k} - \mu_{i2k})^2 \tag{9}$$

Further, it is understood that the above equation (8) is the same in type as equation (1) used when the signal sources to be merged are selected. This implies that the signal sources are merged and split under the consistent criterion.

After that, M is set to M+1 (M=M+1) (in step 10), and the split and the state of the two signal sources selected in step 9 are reconstructed (in step 11).

$Q_{(i')}$ is split into two signal sources $Q_{(I)}$ or $Q_{(J)}$. In this case, one (the unit distribution) of the two mixture distributions of $Q_{(i')}$ is allocated to these two states as the output probability distribution, respectively, and further the self transition probability value of $Q_{(i')}$ and the transition probability value to the succeeding state of $Q_{(i')}$ are copied as they are.

In this processing, the splitting processing of the signal sources ends. Further, when the signal source is split, it is necessary to reconstruct the states thereof at the same time.

The state is reconstructed by adopting the largest value from among the maximum likelihood $P_D$ attained when only the sharing structure of the signal sources is reconstructed, the maximum likelihood $P_C$ attained when one state is split in the phoneme environment direction, and the maximum likelihood $P_T$ attained when one state is split in the time direction (in step 11-4). These three processings are executed, and the optimum splitting method is selectee in step 11. This processing is explained in further detail hereinbelow.

The reconstruction of only the shared structure of the signal sources (the first splitting method) in step 11-1 is a processing which must be executed only when the signal source $Q_{(i')}$ to be split is shared by a plurality of the states. In this case, the state splitting processing after that (steps 11-2 and 11-3) are executed continuously on the basis of the model obtained as the result of this processing. Further, in the case where the $Q_{(i')}$ is the signal source used only in one state, the processing in this step is omitted, and $P_D$ is set to $-\infty$, proceeding to the next step (step 11-4).

Here, a set of the states each having a pointer to the signal source $Q_{(i')}$ is denoted by S. Here, the signal sharing structure is reconstructed by allocating any one of two signal sources $Q_{(I)}$ or $Q_{(J)}$ to the elements of S. This allocation can be executed by obtaining the maximum value $P_D$ calculated by the following equation (10).

$$P_D = \sum_{s \in S} \max(p_{sI}(Y_s), p_{sJ}(Y_s)) \tag{10}$$

where $Y_s$: a set of learning samples represented by paths passing through state s $P_{sI}(Y_s)$: sum total likelihood to $Y_s$ calculated by allocating $Q_{(I)}$ to state s Further, at a time when $P_D$ is obtained, if $p_{SI}(Y_s) > P_{sJ}(Y_S)$ the signal source $Q_{(I)}$ is allocated to state s. If not, the signal source $Q_{(J)}$ is allocated to state s.

Further, the state splitting in the phoneme environment direction in step 11-2 (the second splitting method) is executed by splitting one state s in the elements of S into two states, and by coupling these split states in parallel. More specifically, the second splitting method is that one state is split into two states corresponding two different phoneme context categories in a parallel (phoneme context) direction, in order to absorb fluctuations of the static speech features due to difference in phoneme context.

In this case, it is necessary to split the learning sample represented by the path passing through the state to be split into two paths passing through a newly generated state.

This splitting can be executed by obtaining the state s' and the factor f' which can maximize $P_C$ calculated by equation (11) with respect of the phoneme environment factor f (factor having two or more elements) split into two states s, and further by splitting the element belonging to f'.

$$P_c = \max_{s \in S} \left[ \max_{f} \sum_{e} \max(q_I(y_{sfe}), q_J(y_{sfe})) + \sum_{s' \in S, s' \neq S} \max(p_{s'I}(Y_S), p_{s'J}(Y_S)) \right] \tag{11}$$

where f : split factor in state s $a_{sfe}$ : the e-th factor belonging to factor f of state s $y_{sfe}$ : partial set of $Y_s$ having $a_{sfe}$ as factor f $q_I(y_{sfe})$: sum total likelihood to $y_{sfe}$ calculated by allocating $Q_{(I)}$ to state s At a time when the state s' to be split and factor f' are obtained, the path to which the element $a_{s'f'e}$ of f' is split is decided on the basis of the already obtained values $q_I(y_{s'f'e})$ and $q_J(y_{s'f'e})$ and in accordance with the following equation (12).

$$a_{s'f'e} \begin{cases} A_{IF'}(q_I(y_{s'f'e}) \geq q_J(y_{s'f'e})) \\ A_{JF'}(q_I(y_{s'f'e}) < q_J(y_{s'f'e})) \end{cases} \tag{12}$$

where $A_{tf}$: a set of elements of factors f' allocated to path passing through state having pointer to Q(t)

After $A_{IF'}$ and $A_{JF'}$ have been decided, the following processing is executed for two states $S_{(I)}$ and $S_{(J)}$ newly generated by splitting the state s'. First, I and J are substituted for pointers attached to these state signal sources, respectively. Secondary, as the phoneme environment data, $A_{IF'}$ and $A_{JF'}$ are allocated to the portions related to factor f'. Further, the contents of the factor f held in the state s before split are copied as they are to the factor f other than f'. The state splitting in the phoneme environment direction thus ends.

Further, in the state splitting in the time direction in step 11-3 (the third splitting method), one state s of the elements of S is spit into two states, and further these split states are coupled in series. More specifically, the third splitting method is that one state is split into two states corresponding two different speech sections in a series (time) direction, in order to absorb fluctuations of the dynamic speech features existing in some phoneme context category.

In this case, two possibilities can be considered as to which one of $Q_{(I)}$ and $Q_{(J)}$ is allocated as the front state. Therefore, the state s' and the signal sources are decided in such a way as to maximize $P_T$ calculated by the following equation (13):

$$P_T = \max_{s \in S} \left[ \max(r_i(Y_s), r_j(Y_s)) + \sum_{s' \in S, s' \neq S} \max(p_{si}(Y_{s'}), p_{sj}(Y_{s'})) \right] \quad (13)$$

where $r_i(Y_s)$: sum total likelihood for Y when $Q_{(i)}$ is allocated to the front state.

After that the state s' is split, and the newly generated two states $S_{(f)}$ and $S_{(f)}$ are processed as follows:

First, I and J are substituted for pointers of the signal sources of these states, respectively. Then, if $r_I (Y_{s'}) > r_j (Y_{s'})$, the state $S_{(f)}$ is allocated to the front side. If not, the sate $S_{(f)}$ is allocated to the front side, to reconstruct the network.

Finally, as these phoneme environment data, the contents held in the state s' before split are copied as they are. The state splitting in the time direction thus ends.

Three splitting processing have been described above, and the optimum splitting method is selected in step 11-4. Further, the splitting in the phoneme context direction shown in step 11-2 and the splitting in the time direction in step 11-3 are executed for only the model obtained as the result of reconstruction of the signal sources sharing structure shown in step 11-1.

In a part of the signal sources of HMnet selected and formed in step 11-4, two mixture distribution approximately obtained by the merging processing and the unit distribution given during the splitting process have been included as they are.

Therefore, in order to optimize the parameters of the entire signal sources and to prepare for the succeeding reiterative processing, the output probability distribution and the state transition probability are relearned for all the signal sources existing in the range where the merging processing and the splitting processing exert some influence (in step 12).

After that, the total likelihood obtained as the result of learning is substituted for $P_{(M)}$ (in step 13), and the merging processing and the splitting processing for the signal sources are kept continued, until the number M of signal sources in the total modes reaches a predetermined value.

The structure of HMnet can be decided by the above-mentioned processing. At this time point, two mixture Gaussian distribution is allocated to all the output probability distribution of the respective signal sources. Therefore, finally, the entire HMnet is learned again in order to change the output probability distribution to the finally required shape (the unit Gaussian distribution in this embodiment, however the mixture Gaussian distribution can be also adopted) (in step 15). The formation of HMnet can be completed as described above.

As described above, in the acoustic model generating method for speech recognition according to the present invention, since the splitting and merging of the signal sources are reiterated under successive selection condition, it is possible to automatically generate an acoustic model which can represent diversified speech phenomena on the basis of the minimum possible signal sources.

Further, the merging processing is executed before the splitting processing, in such a way that the merging processing result is adopted only when the evaluation value of the learning samples obtained as the result of the merging processing is higher than the evaluation value calculated on the basis of previously-obtained models having the signal sources whose number is the same as that of the model obtained as the result of the merging processing. Further, other than the above case, the merging processing result is disused, and the signal source is split by use of the model obtained before the merging processing. Therefore, it is possible to optimize the model effectively, without losing the respective advantages of the merging processing and splitting processing.

Further, the splitting processing includes at the same time the following three methods: (a) a first splitting method (two signal sources are split into two, and a shared structure between a plurality of states having common signal sources to be split is reconstructed), (b) a second splitting method (one state is split into two states corresponding two different phoneme context category in parallel direction, in order to absorb fluctuations of static speech features due to difference in phoneme context, and (c) a third splitting method (one state is split into two states corresponding two different speech sections in series direction, in order to absorb dynamic speech feature fluctuations existing in some phoneme context category). Therefore, it is possible to cope with the splitting of the signal sources shared in a plurality of states, by selecting one of the splitting methods in sequence in such a way as to obtain the higher evaluation value for the actual speech samples.

What is claimed is:

1. An acoustic model generating method for a speech recognition dependent upon phoneme context, for executing speech data processing using hidden Markov models obtained by modeling static speech features indicative of speech feature pattern shape in minute time and dynamic speech features indicative of speech change with the lapse of time, as a chain of signal sources composed of one output probability distribution and one set of state transition probability, which comprises the steps of:

reiterating splitting processing or merging processing of the output probability distribution of at least one signal source of an initial model by selecting one of the processing successively to generate a plurality of signal sources, until a specific number of the generated signal sources reaches a predetermined value for achieving optimum speech recognition; and deciding, when the number reaches the predetermined value, a sharing structure of states used for representing a model among a plurality of models, a sharing structure of each signal source among the states, and a parameter of each output probability distribution, all under a common evaluation criterion.

2. The acoustic model generating method for a speech recognition of claim 1, wherein the merging processing includes a step of merging two different signal sources having similar characteristics into a single signal source, to reduce the number of signal sources without deteriorating precision of the acoustic models.

3. The acoustic model generating method for a speech recognition of claim 2, the merging step including the steps of:

calculating a magnitude of distribution on an acoustic parameter space obtained by synthesizing each pair of the signal sources; and merging two signal sources of a pair having the minimum calculated distribution.

4. The acoustic model generating method for a speech recognition of claim 1, wherein the merging processing is executed prior to the splitting processing, and the method further comprising the steps of:

adopting a merging processing result only when a first evaluation value of learning samples obtained as a result of the merging processing is higher than a second evaluation value calculated on the basis of already-obtained models having signal sources whose number is the same as that of the model obtained as the result of the merging processing; and re-executing the splitting processing by use of the models already obtained before the merging processing when the first evaluation value is not higher than the second evaluation value.

5. The acoustic model generating method for a speech recognition of claim 4, wherein the adopting step includes the step of obtaining two pieces of sum total likelihood as the evaluation values.

6. The acoustic model generating method for a speech recognition of claim 1, wherein the splitting processing includes the step of splitting a first signal source into a second and a third signal source, allocating two mixture distributions of the first signal source to the second and third signal sources, respectively, as output probability distribution, and copying self transition probability value of the first signal source and transition probability value to the succeeding signal source to the second and third signal sources.

7. The acoustic model generating method for a speech recognition of claim 1, wherein the splitting processing includes either of:

a first splitting step of splitting two signal sources into two, and reconstructing a shared structure between a plurality of states having common signal sources to be split;

a second splitting step of splitting one state into two states corresponding two different phoneme context categories in phoneme context direction, in order to absorb fluctuations of the static speech features due to difference in phoneme context; and a third splitting step of splitting one state into two states corresponding two different speech sections in time direction, in order to absorb fluctuations of the dynamic speech features existing in some phoneme context category, further the acoustic model generating method comprises a step of selecting one of the three splitting steps so that an evaluation value for actual speech samples can be obtained.

8. The acoustic model generating method for a speech recognition of claim 7, wherein the selecting step includes the steps:

obtaining three pieces of maximum likelihood for the three splitting steps; and judging which one of the three pieces of maximum likelihood is the biggest to select the splitting step for which the biggest likelihood is obtained.

* * * * *